(12) United States Patent
Kim et al.

(10) Patent No.: US 10,653,900 B2
(45) Date of Patent: May 19, 2020

(54) LIFESAVING SYSTEM USING DRONE AND LIFESAVING METHOD USING THE SAME

(71) Applicant: EDUN-ENG CO., LTD., Changwon (KR)

(72) Inventors: Hyeong Ho Kim, Busan (KR); Chul Choi, Gimhae (KR)

(73) Assignee: EDUN-ENG CO., LTD., Changwon (KR)

( * ) Notice: Subject to any disclaimer, the term of this patent is extended or adjusted under 35 U.S.C. 154(b) by 367 days.

(21) Appl. No.: 15/811,136

(22) Filed: Nov. 13, 2017

(65) Prior Publication Data
US 2019/0060679 A1 Feb. 28, 2019

(30) Foreign Application Priority Data
Aug. 28, 2017 (KR) .................. 10-2017-0108750

(51) Int. Cl.
| | | |
|---|---|---|
| A62B 1/00 | (2006.01) | |
| B64D 17/54 | (2006.01) | |
| B64D 17/78 | (2006.01) | |
| B64D 17/62 | (2006.01) | |
| B64C 39/02 | (2006.01) | |
| A62B 1/22 | (2006.01) | |

(52) U.S. Cl.
CPC .................. *A62B 1/00* (2013.01); *A62B 1/22* (2013.01); *B64C 39/024* (2013.01); *B64D 17/54* (2013.01); *B64D 17/62* (2013.01); *B64D 17/78* (2013.01); *B64C 2201/185* (2013.01)

(58) Field of Classification Search
CPC ........... A62B 1/00; A62B 1/22; B64C 39/024; B64C 2201/185; B64D 17/54; B64D 17/62; B64D 17/78
See application file for complete search history.

(56) References Cited

U.S. PATENT DOCUMENTS

| | | | | |
|---|---|---|---|---|
| 3,921,944 A | * | 11/1975 | Morrison ................ | A62B 1/22 244/138 R |
| 5,826,678 A | | 10/1998 | Yu | |
| 2003/0222178 A1 | * | 12/2003 | Chen ..................... | A62B 1/22 244/143 |
| 2005/0040290 A1 | * | 2/2005 | Suhami ................ | B64D 17/66 244/146 |

(Continued)

FOREIGN PATENT DOCUMENTS

| | | |
|---|---|---|
| KR | 1999-0037765 A | 5/1999 |
| KR | 2003-0030081 A | 4/2003 |

(Continued)

*Primary Examiner* — Rodney A Bonnette
(74) *Attorney, Agent, or Firm* — Harness, Dickey & Pierce, P.L.C.

(57) ABSTRACT

Disclosed is a lifesaving system using a drone and a lifesaving method using the lifesaving system. The lifesaving system includes: a lifesaving drone provided with a parachute, the drone approaching a victim by being remotely controlled and installed in the victim, and assisting rescuing the victim from a high-rise building by operating the parachute; and a disaster management center disposing a rescuing vehicle to a disaster occurrence area and remotely controlling the lifesaving drone when a disaster report is received, or a disaster occurrence area is recognized.

9 Claims, 5 Drawing Sheets

(56) References Cited

U.S. PATENT DOCUMENTS

| | | | | |
|---|---|---|---|---|
| 2008/0179462 | A1* | 7/2008 | Murphy | A41D 13/02 244/143 |
| 2013/0206915 | A1* | 8/2013 | Desaulniers | B64C 39/024 244/165 |
| 2017/0166309 | A1* | 6/2017 | Sekiya | B64D 11/062 |

FOREIGN PATENT DOCUMENTS

| | | |
|---|---|---|
| KR | 2007-0071835 A | 7/2007 |
| KR | 10-0830212 B1 | 5/2008 |
| KR | 10-1562205 B1 | 10/2015 |

\* cited by examiner

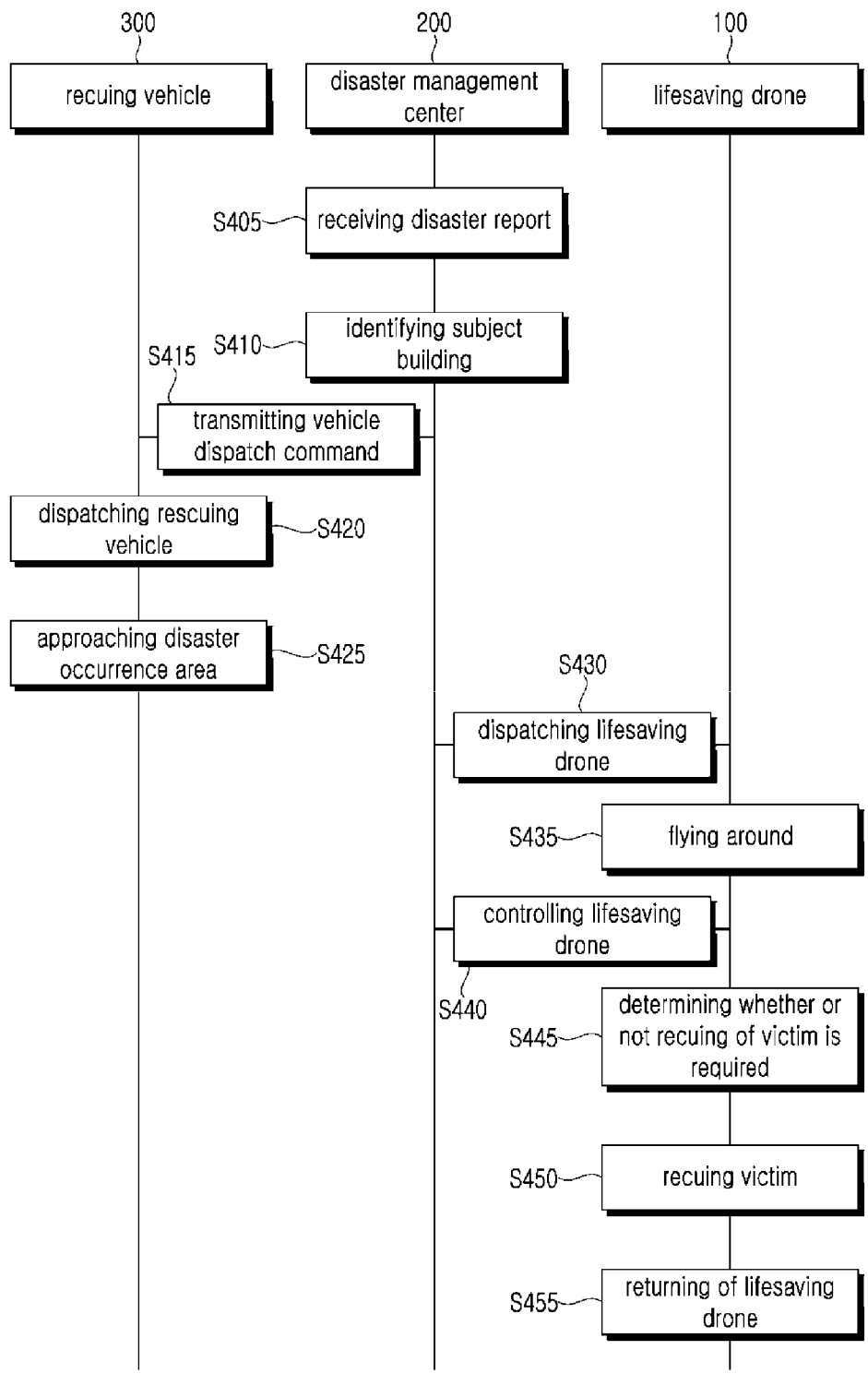

LIFESAVING SYSTEM USING DRONE AND LIFESAVING METHOD USING THE SAME

CROSS REFERENCE TO RELATED APPLICATION

The present application claims priority to Korean Patent Application No. 10-2017-0108750, filed Aug. 28, 2017, the entire contents of which is incorporated herein for all purposes by this reference.

BACKGROUND OF THE INVENTION

Field of the Invention

The present invention relates generally to a lifesaving system and method. More particularly, the present invention relates to a lifesaving system using a drone.

Description of the Related Art

Unless otherwise indicated herein, the approaches described in this section are not prior art to the claims in this application and are not admitted to be prior art by inclusion in this section.

When a fire occurs in a high-rise building, it is not easy to evacuate or escape from the fire site. Depending on the size of the building, the building may be fully equipped with escaping apparatuses. However, when a fire occurs, it becomes embarrassed whereby using such apparatuses becomes difficult. Therefore, one can become defenseless without an external help when a fire occurs in a high-rise building. In addition, when an escaping path of a high-rise building is shut off due to the fire, victims try to escape through an external window of the building to evade fire or smoke, which may directly lead to injury or death.

In addition, a method of using a high-ladder vehicle for lifesaving may not able to rescue a victim who is at a high position that the ladder cannot reach. In addition, it is difficult to rapidly rescue the victim since dispatching of the high-ladder vehicle, ensuring position of the high-ladder vehicle, and expanding of the high-ladder vehicle take long time.

In addition, an aircushion may be used in preparation for a falling of the victim, but a large installation space is required to install the aircushion. In addition, it takes long time to deliver and install the aircushion, and an air-injection therefor. In addition, when the victim makes a jump from a high position, an accuracy of an estimated landing position of the victim may be reduced due to winds, posture of the victim, etc. Thus, injury of death may occur.

As a system of escaping from a fire of a high-rise building, Korean Patent No. 10-1562205 discloses a system providing stairs which are installed in a balcony so that a victim may descend[go down] the stairs. However, the system is not useful since the system should be installed in all independent spaces of the building. In addition, a number of documents (Korean Patent Application Nos. 10-2001-0061721, 10-2005-0135620, 10-2007-0057324, Korean Utility Model Application No. 20-1988-0003595, and US Patent Publication No. 5826678) discloses a rescuing apparatus for the same, but the system must be sufficiently large to support a weight of a person and decrease a falling speed. In addition, the rescuing apparatus should be provided at all times.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-1562205;
(Patent Document 2) Korean Patent Application No. 10-2001-0061721;
(Patent Document 3) Korean Patent Application No. 10-2005-0135620;
(Patent Document 4) Korean Patent Application No. 10-2007-0057324;
(Patent Document 5) Korean Utility Model Application No. 20-1988-0003595; and
(Patent Document 6) U.S. Patent Publication No. 5826678

SUMMARY OF THE INVENTION

Accordingly, the present invention has been made keeping in mind the above problems occurring in the related art, and the present invention is intended to propose a high-rise building fire lifesaving system using an unmanned aerial vehicle, and a method therefor, whereby the system and method are capable of minimizing injury or death caused by a fall during a fire by dispatching an unmanned lifesaving drone and ascertaining a disaster site situation when the fire occurs in the high-rise building, and when a victim is detected, assisting the victim to escape from the disaster site.

Another object of the present invention is to propose a high-rise building fire lifesaving system, and a method therefor, wherein the system and method are capable of identifying a victim by remotely controlling an unmanned lifesaving drone and transferring an escaping means to the victim so that rescuing activities are carried out without directly putting rescuers into the fire site and without any interference with fire-fighting persons and vehicles. In addition, rescuing activities are carried out by rapidly putting the unmanned lifesaving drone into operation even when an access to the disaster site is limited or not easy.

Still another of the present invention is to propose a high-rise building fire lifesaving system, and a method therefor, wherein the system and method are capable of rapidly ascertaining a site situation of a wide area and assisting in rescuing a number of victims with low cost by providing a number of unmanned lifesaving drones.

According to an embodiment, a lifesaving system using a drone includes: a lifesaving drone provided with a parachute, the drone approaching a victim by being remotely controlled and put on by the victim, and assisting rescuing the victim from a high-rise building by operating the parachute; a drone hangar system in which the lifesaving drone is loaded; and a disaster management center remotely controlling the lifesaving drone dispatched from the drone hangar when a disaster reported is received, or a disaster occurrence area is recognized.

According to another embodiment, a lifesaving method using a lifesaving system using a drone includes: receiving, by a disaster management center, a disaster report, or recognizing a disaster occurrence; dispatching, by the disaster management center, a lifesaving drone provided with a parachute from a drone hangar system to a disaster occurrence area; remotely controlling, by the disaster management center, the lifesaving drone to rescue a victim of the disaster occurrence area; and rescuing the victim from the disaster occurrence area by operating, by the lifesaving drone, the parachute provided at the lifesaving drone when the lifesaving drone approaches the victim and the victim puts on the lifesaving drone.

According to the present invention, when there is no specific evacuation means or escaping means in a disaster situation, a lifesaving drone may be used as a supplementary lifesaving means in a fire disaster site of a high-rise building since the lifesaving drone may rapidly approach a victim, and directly transfer an escaping apparatus such as parachute.

In addition, approaching a victim, identifying the victim, and providing a lifesaving apparatus may become easy by using a lifesaving system of the present invention due to developments on flight control technique of a drone, a camera technique, a sensor technique, etc.

The effects of the present disclosure is not limited to the above mentioned effects, and should be understood that whole effects inferable from a configuration thereof which is written in a description and claims thereof are included.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a signal flowchart of the lifesaving system according to the embodiment.

DETAILED DESCRIPTION OF THE INVENTION

Merits and characteristics of the present invention, and methods for accomplishing them will become more apparent from the following embodiments taken in conjunction with the accompanying drawings. However, the present invention is not limited to the disclosed embodiments, but may be implemented in various manners. The embodiments are provided to complete the disclosure of the present invention and to allow those having ordinary skill in the art to understand the scope of the present invention. The present invention is defined by the category of the claims. The same reference numbers will be used throughout the drawings to refer to the same or like parts.

In the following description of the present invention, detailed descriptions of known functions and components incorporated herein will be omitted in the case that the subject matter of the present invention is rendered unclear. Some tams described below are defined by considering functions in the invention and meanings may vary depending on, for example, a user or operator's intentions or customs. Therefore, the meanings of terms should be interpreted based on the scope throughout this specification.

The present invention provides a high-rise building fire lifesaving system using an unmanned aerial vehicle (drone), and a method therefor, wherein the system and the method are capable of minimizing injury or death caused by a fall during a fire by dispatching an unmanned lifesaving drone and ascertaining a disaster site situation when a fire occurs in the high-rise building, and when a victim is detected, assisting the victim to escape from the disaster site.

Figure 1:
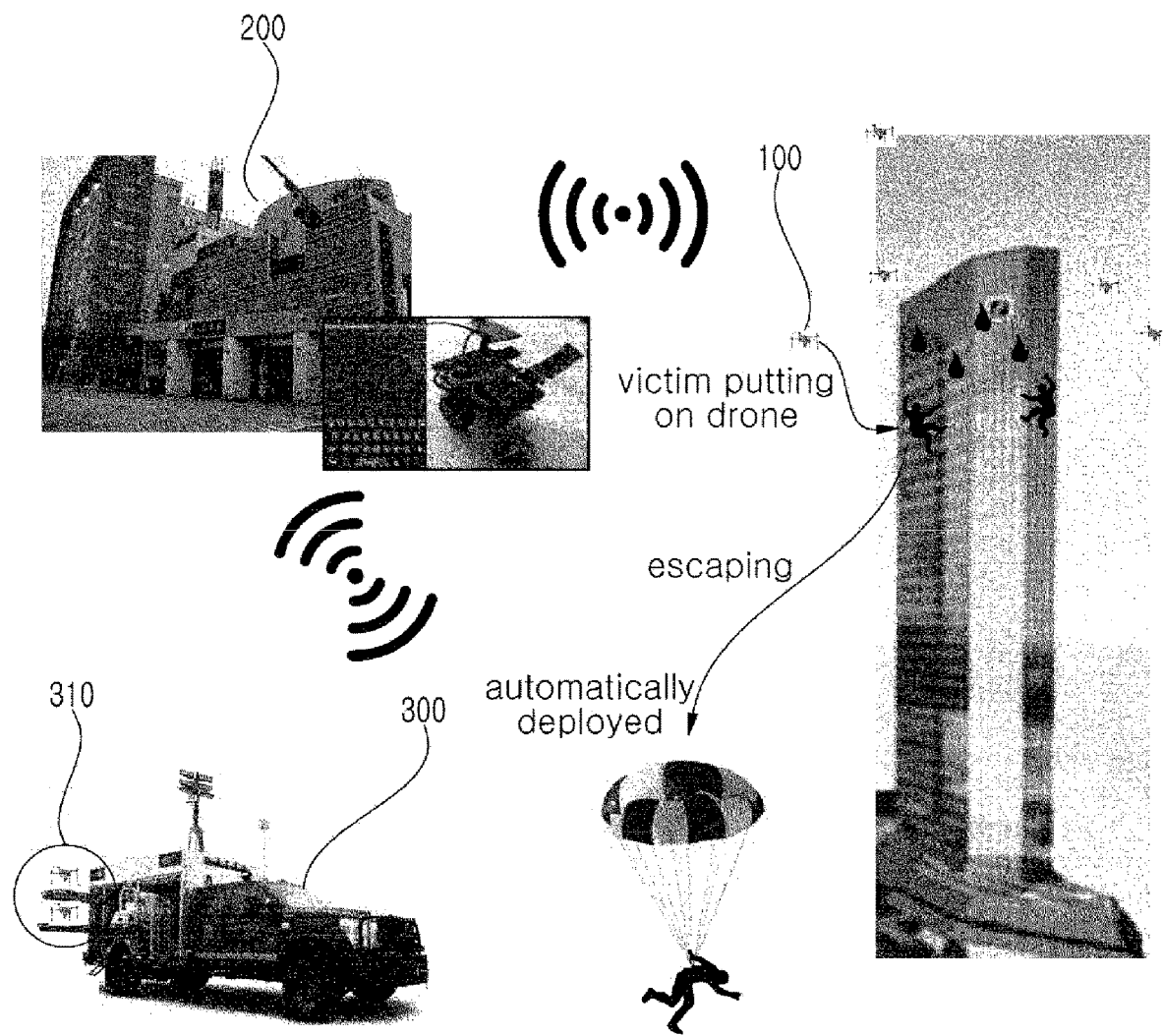
FIG. 1 is a view showing a configuration of a lifesaving system using a drone used in a disaster site according to an embodiment and an application example thereof.

FIG. 1 is a view showing a configuration of a lifesaving system using a drone used in a disaster site according to an embodiment and an application example thereof.

Referring to FIG. 1, the lifesaving system may include a lifesaving drone 100, a disaster management center 200, and a rescuing vehicle 300.

The lifesaving drone 100 assists rescuing a victim from a disaster occurrence area or facility including a high-rise building by being remotely controlled by the disaster management center 200. For example, the lifesaving drone 100 includes a parachute, which is one of lifesaving equipment, flies to a building where a disaster occurs and assists the victim to escape from the disaster occurrence area by using the parachute. In detail, the victim may put on the lifesaving drone itself when the lifesaving drone approaches him or her. The parachute is included in the lifesaving drone. When the victim escapes from the disaster occurrence area by putting on the lifesaving drone including the parachute, the parachute is automatically deployed from the lifesaving drone. For example, the lifesaving drone 100 assists the victim to safely land on the ground by adjusting parachute operations according to a weight of the victim putting on the parachute and a current altitude of the lifesaving drone 100. In detail, the lifesaving drone 100 may measure the weight of the victim putting on the parachute and the current altitude of the lifesaving drone, calculate a deployment timing of the parachute, and control the parachute to be deployed at the calculated timing so that the victim safely lands on the ground.

A drone hangar system is a lifesaving drone hangar where the lifesaving drone 100 generally stands by. If necessary, the drone hangar system is used for performing operations and inspections of the lifesaving drone 100 such as maintenance and repair. The drone hangar system may be a ground hangar designated in an area where tall buildings are densely packed or nearby the disaster management center 200. However, the drone hangar system may be configured with the rescuing vehicle 300 that is movable.

The rescuing vehicle 300 may load the lifesaving drone 100 in a drone loading area 310 of the rescuing vehicle 300, moves to the disaster occurrence area, and dispatches the lifesaving drone 100 to a disaster site according to a control and a command of the disaster management center 200.

The disaster management center 200 may dispatch the lifesaving drone 100 from the drone hangar system or disposes the rescuing vehicle 300 to the disaster occurrence area when a disaster report is received or a disaster occurrence is recognized so that a victim is rescued by remotely controlling the lifesaving drone 100.

Figure 2:
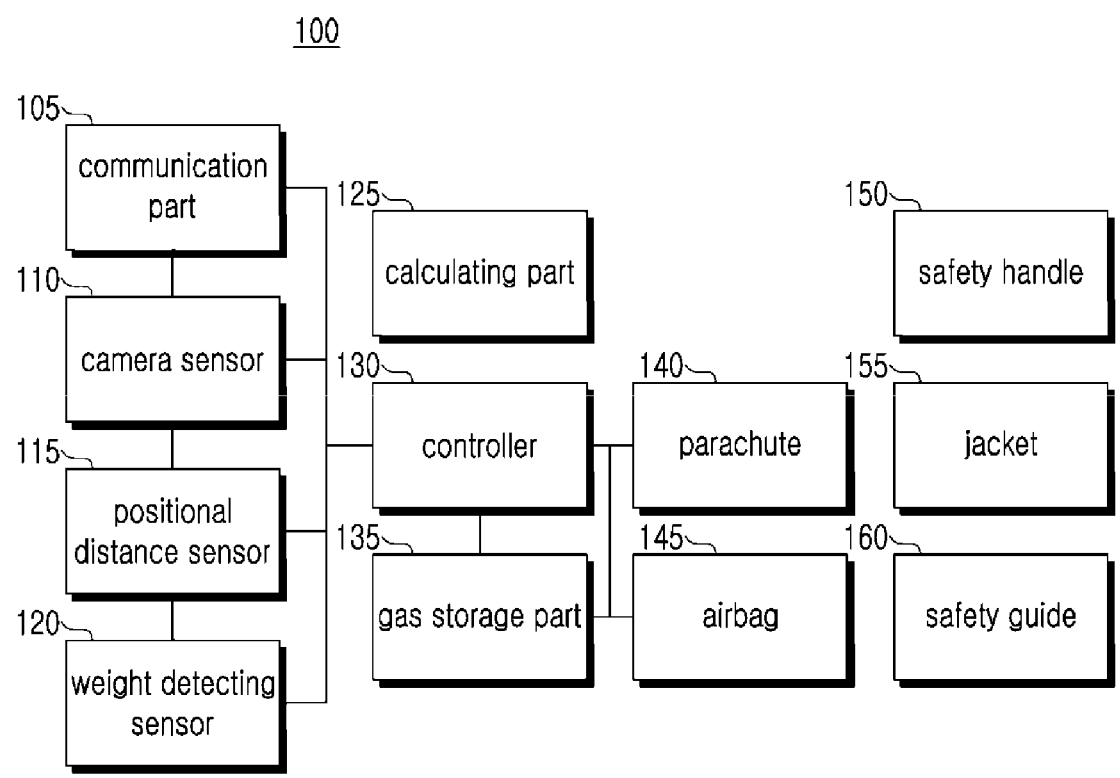
FIG. 2 is a block diagram of a lifesaving drone according to an embodiment.

FIG. 2 is a block diagram of a lifesaving drone according to an embodiment.

Referring to FIG. 2, the lifesaving drone 100 may include a communication part 105, a camera sensor 110, a positional distance sensor 115, a weight detecting sensor 120, a calculating part 125, a controller 130, a gas storage part 135, a parachute 140, an airbag 145, a safety handle 150, a jacket 155, and a safety guide 160.

The communication part 105 controls an operation of the lifesaving drone 100 by receiving a drone control command from the disaster management center 200, and receives positional information of the rescuing vehicle 300 and positional information of the disaster occurrence area from the disaster management center 200 and the rescuing vehicle 300. In addition, the communication part 105 may transmit to the disaster management center 200 data required for ascertaining a disaster site situation such as images and videos which are captured by the lifesaving drone 100 when the lifesaving drone 100 flies around the disaster occurrence area.

The camera sensor 110 is installed in the lifesaving drone 100 and captures front directional images required for remotely controlling the flight of the lifesaving drone 100 as well as images and videos required for transferring information of a disaster occurrence area situation, and transmits the captured images and videos to the disaster management center 200. The camera sensor 110 may be a general optical camera, or may include a thermo-graphic camera showing heat distribution by measuring surface temperature of an object and making the measured temperature into a virtual color image. In addition, the camera sensor 110 may include a smoke image processor capable of identifying a position of the victim by removing smoke from the image, the smoke is removed from the image by distributing image data distributed in a high gradation into a low gradation by using a color convergence process that converges a gamma value according to a luma distribution when a large amount of smoke is present in the fire site.

The positional distance sensor 115 detects a position and an altitude of the lifesaving drone 100, a distance between the lifesaving drone 100 and the rescuing vehicle 300, a distance between the lifesaving drone 100 and the disaster management center 200, and a position of the victim and a distance from the lifesaving drone 100. In one embodiment, the positional distance sensor 115 may include various sensors measuring a distance between two positions using a triangulation method such as a sensor measuring a distance using positional information based on GPS data, a laser distance measuring sensor, an ultrasonic wave distance measuring sensor, etc.

The weight detecting sensor 120 measures a weight of the victim.

The calculating part 125 calculates descent variables including a parachute deployment (unfolding) timing, a falling time required for landing of the lifesaving drone 100 from a current altitude, an estimated landing time, a landing position, etc. by using the measure weight of the victim and the current altitude of the lifesaving drone 100.

The controller 130 controls so that the parachute is automatically deployed at the calculated parachute deployment timing to assist a safe landing of the victim based on the calculated descent variables. The airbag 145 is operated at the estimated landing time to ensure a safe landing of the victim after the parachute being deployed.

The gas storage part 135 stores gas sprayed to help a rapid deployment of the parachute, and the rapid deployment of the parachute is required in preparation for a short falling distance when the victim makes a jump from a building. In addition, the gas storage part 135 stores gas for inflating the airbag 145 used for protecting the victim when making the jump.

The safety handle 150 is a configuration element included for helping the victim to escape from the disaster site by holding it with his or her hand when the lifesaving drone is not easy to put on. The safety handle 150 is configured not to be separated from the wrist of the victim after being fastened with the wrist. In one embodiment, when the victim fails to put on the lifesaving drone 100 and uses the safety handle 150, an elastic string may be used for preventing wrist injury according to a load generated at the deployment timing of the parachute.

The jacket 155 may store various rescuing devices, and store a rescuing devices required for rescuing the victim such as devices for fastening the victim and the lifesaving drone 100 (or parachute), safety pints, etc. The safety guide 160 protects the victim from a rotating part of the lifesaving drone 100 or from the operation thereof, and prevents damage of the lifesaving drone 100 that can be caused when colliding with the building.

Figure 3A:
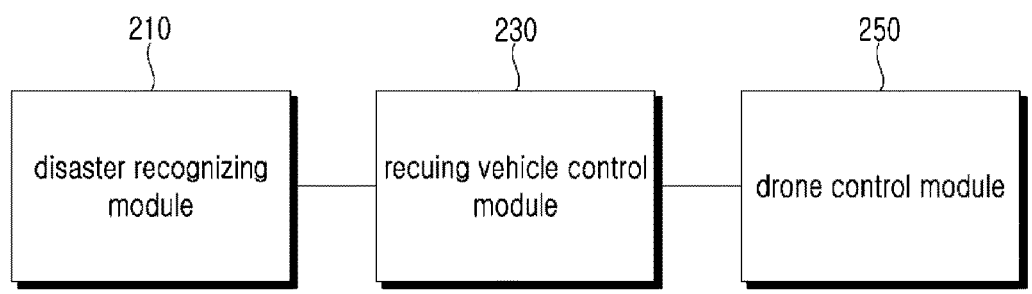
FIG. 3A is a block diagram showing a configuration of a disaster management center according to an embodiment.

FIG. 3A is a block diagram showing a configuration of a disaster management center according to an embodiment.

Referring to FIG. 3A, the disaster management center 200 may include a disaster recognizing module 210, a rescuing vehicle control module 230, and a drone control module 250. In the present description, the term 'module' should be understood to include software, hardware, or a combination thereof according to a context in which the term is used. For example, the software may be a machine language, a firmware, an embedded code, and application software. As another example, the hardware may be a circuit, a processor, a computer, an integrated circuit, an integrated circuit core, a sensor, an MEMS (Micro-Electro-Mechanical System), a passive device, or a combination thereof.

The disaster recognizing module 210 detects a disaster occurrence including a fire, an earthquake, a tsunami, and a terror attack. For example, the disaster recognizing module 210 may recognize a disaster situation by communicating with a server of Public Safety and Security Ministry. The rescuing vehicle control module 230 dispatches the rescuing vehicle 300 to the disaster occurrence area when the drone hangar system is configured with a movable vehicle, and controls the rescuing vehicle 300 to transfer the victim to a medical center after rescuing the victim. The drone control module 250 controls detailed flight operations of the lifesaving drone 100 such as steering, speed, etc. to assist rescuing the victim of the disaster occurrence area.

Figure 3B:
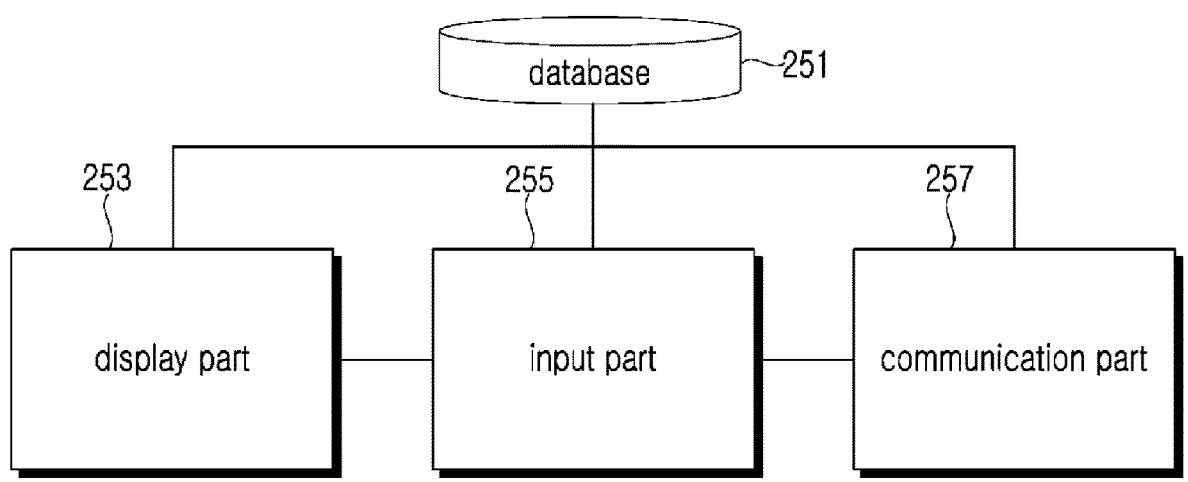
FIG. 3B is a block diagram showing a detailed configuration of a drone control module according to an embodiment.

FIG. 3B is a block diagram showing a detailed configuration of a drone control module according to an embodiment.

Referring to FIG. 3B, the drone control module 250 may include a database 251, a display part 253, an input part 255, and a communication part 257.

The database 251 stores positional data based on a GPS, and detailed information of buildings or facilities included in the disaster occurrence area. For example, the database 251 stores detailed information of each building, such as history, material, installation of fire alarm facility, and evacuation facility, required for rescuing in case of the disaster occurrence. In addition, the database 251 stores data required for performing rescuing activities of the victim through a drone control such as position of an emergency caring center, etc.

The display part 253 displays images captured by lifesaving drone 100 while flying and which are transmitted from the camera sensor installed in the lifesaving drone 100. In addition, the display part 253 may display real-time positional information and status information of the lifesaving drone 100. For example, the status information of the lifesaving drone 100 may include a remaining amount of a battery, apparatus status information such as flight stability, whether or not malfunctioning part is present, etc.

The input part 255 receives input of command information used for remotely controlling the operation of the lifesaving drone 100 such as steering, altitude adjustment, speed, etc.

The communication part 257 transmits the input command information, and receives information sensed by the lifesaving drone 100.

Hereinafter, a lifesaving method will be described in order. Operations (functions) of the lifesaving method according to an embodiment of the present invention are essentially identical to functions of the lifesaving system, thus descriptions of overlapped parts with FIG. 1 to FIG. 3B will be omitted.

FIG. 4 is a signal flowchart of the lifesaving system according to the embodiment.

In step S405, the disaster management center 200 receives a disaster report. In step S410, a subject building in which the disaster such as fire has occurred is identified according to received disaster reporting information. Then, in step S415, the disaster management center 200 transmits a rescuing vehicle dispatch command to the rescuing vehicle 300 when the drone hangar system is configured with a movable vehicle. In step S420, the rescuing vehicle 300 that has received the rescuing vehicle dispatch command is dispatched to a disaster occurrence area. In step S425, the rescuing vehicle 300 approaches the disaster occurrence area. Steps S415 to S425 may be omitted when the drone hangar system is configured with a ground hangar.

When the rescuing vehicle 300 approaches the disaster occurrence area, in step S430, the disaster management center 200 transmits a dispatch command to the lifesaving drone 100 loaded in the rescuing vehicle 300. When the drone hangar system is configured with a ground hangar, the disaster management center 200 transmits a dispatch command to the lifesaving drone 100 loaded in the drone hangar system. In step S435, the lifesaving drone 100 flies around the disaster occurrence area according to the dispatch command transmitted from the disaster management center 200. When flying around, the lifesaving drone 100 transmits front directional images, and disaster site images and videos to the disaster management center 200. Then, in step S440, the disaster management center 200 transmits a detailed operational control signal to the lifesaving drone 100 according to the received site images and videos.

In step S445, the lifesaving drone 100 determines whether or not rescuing of a victim is required according to the received control command. If so, in step S450, the lifesaving drone 100 assists rescuing the victim by approaching him or her so that the victim may put on the parachute included in the lifesaving drone 100 and escape from the disaster site by using the parachute. After the victim is safely rescued, in step S455, the lifesaving drone 100 is returned to the rescuing vehicle 300 or the ground hangar, or assists rescuing another victim by approaching him or her after recharging consumable devices such as parachute, battery, gas, etc.

Figure 5:
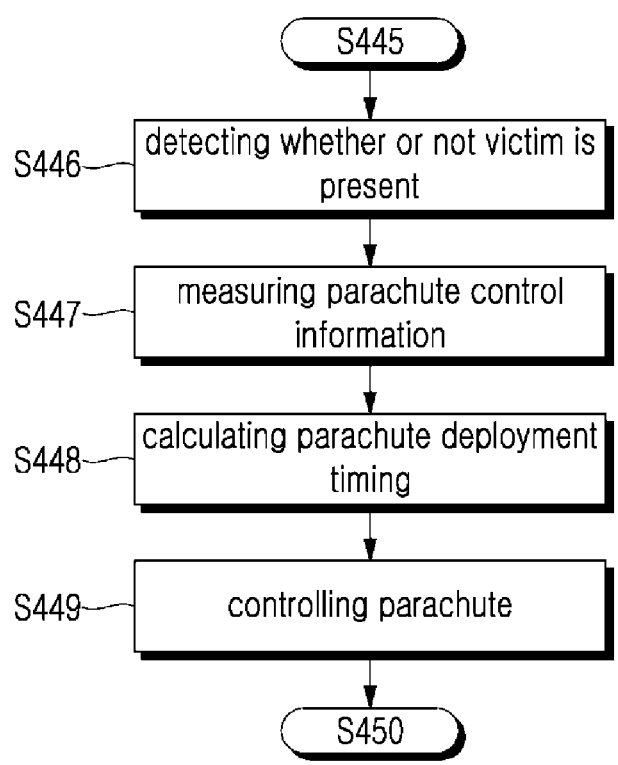
FIG. 5 is a view showing a flowchart of data process for calculating descent variables volume according to an embodiment.

FIG. 5 is a view showing a flowchart of data process for calculating descent variables according to an embodiment.

In order to determine whether or not rescuing of the victim is required in step S445, in S446, whether or not the victim is present is detected. For example, the lifesaving drone 100 may detect whether or not the victim is present by using a camera sensor, and a temperature measuring sensor. Herein, when it is difficult to secure visibility by smoke caused by fire, the victim may be identified by using a smoke image processing device. When the lifesaving drone 100 determines that the victim is present, in step S447, the lifesaving drone 100 measures parachute control information. In one embodiment, the parachute control information is information required for controlling an operation of the parachute such as deploying the parachute, and is information required for controlling the deploying of the parachute such as a weight of the victim, an altitude of the lifesaving drone 100, a required landing time of the parachute, an estimated landing time of the parachute when the parachute of the lifesaving drone is put on by the Vitim, etc. In step S448, a parachute deployment timing is calculated according to the weight of the victim based on the parachute control information so that the victim safely lands on the ground, and the parachute is controlled to be deployed at the calculated timing. Then, in step S449, the victim is rescued. In one embodiment, in step S450, the airbag is operated at the estimated landing time of the parachute control information so that the victim may land more safely by the parachute.

According to the present invention, when there is no specific evacuation means or escaping means in a disaster situation, a lifesaving drone rapidly approaches a victim, and an escaping apparatus is directly transferred to the victim. Therefore, injury or death may be reduced by using the lifesaving drone as a supplementary lifesaving means in a fire disaster site of a high-rise building.

The above described description is merely an example and is not limited thereto. As the present invention may be embodied in several forms without to departing from the spirit or essential characteristics thereof, it should also be understood that the above-described examples are not limited by any of the details of the foregoing description, unless otherwise specified, but rather should be construed broadly within its spirit and scope as defined in the appended claims.

What is claimed is:

1. A lifesaving system using a drone, the system comprising:
    a lifesaving drone provided with a parachute, the drone approaching a victim by being remotely controlled and put on by the victim, and assisting rescuing the victim from a high-rise building by operating the parachute;
    a drone hangar system in which the lifesaving drone is loaded; and
    a disaster management center remotely controlling the lifesaving drone dispatched from the drone hangar system when a disaster report is received, or a disaster occurrence area is recognized.

2. The system of claim 1, wherein the lifesaving drone includes:
    a communication part receiving a control command from the disaster management center;
    a parachute for rescuing the victim;
    a camera sensor detecting whether or not the victim is present in the disaster occurrence area;
    a positional distance sensor detecting a position and an altitude of the lifesaving drone, a distance between the drone hangar system and the lifesaving drone, and a distance between the victim and the lifesaving drone;
    a weight detecting sensor measuring a weight of the victim to be rescued by using the lifesaving drone;
    a calculating part calculating descent variables volume including a deployment timing of the parachute, a falling time required for landing of the lifesaving drone from a current altitude, an estimated landing time, and a landing position according to the measured weight of the victim and the altitude of the lifesaving drone; and
    a controller controlling an operation of the parachute.

3. The system of claim 2, wherein the lifesaving drone further includes an airbag operated for safe landing of the victim at the estimated landing time after the parachute being deployed.

4. The system of claim 1, wherein the disaster management center includes:

a disaster recognizing module detecting a disaster occurrence including a fire, an earthquake, a tsunami, and a terror attack; and a drone control module controlling detailed controls including whether or not to make a flight of the lifesaving drone, and a steering and a speed of the lifesaving drone for rescuing the victim of the disaster occurrence area.

5. The system of claim 4, wherein the drone control module includes:

a database storing positional data based on a GPS, and information about buildings or facilities included in the disaster occurrence area;

a display part displaying a front directional image of the lifesaving drone and images captured by the lifesaving drone while flying, and which are transmitted by a camera installed in the lifesaving drone;

an input part for inputting a command for remotely controlling an operation of the lifesaving drone including a steering, an altitude, and a speed of the lifesaving drone; and a communication part transmitting the input command to the lifesaving drone.

6. A lifesaving method, wherein the method uses a lifesaving system using a drone, the method comprising:

receiving, by a disaster management center, a disaster report, or recognizing a disaster occurrence;

dispatching, by the disaster management center, a lifesaving drone provided with a parachute from a drone hangar system to a disaster occurrence area;

remotely controlling, by the disaster management center, the lifesaving drone to assist rescuing a victim of the disaster occurrence area; and rescuing the victim from the disaster occurrence area by operating, by the lifesaving drone, the parachute provided at the lifesaving drone when the lifesaving drone approaches the victim and the victim puts on the lifesaving drone.

7. The method of claim 6, wherein the remotely controlling of the lifesaving drone includes:

detecting, by the lifesaving drone, rescue information including whether or not a victim is present, a position of the victim, and an image around the lifesaving drone, and transmitting the detected rescue information to the disaster management center; and receiving, by the lifesaving drone, a drone operational control command from the disaster management center, and controlling the lifesaving drone according to the received control command.

8. The method of claim 6, wherein the controlling of the lifesaving drone according to the received control command includes:

calculating parachute control information including a weight of the victim, an altitude of the lifesaving drone, a required landing time of the parachute, and an estimated landing time of the parachute when the parachute of the lifesaving drone is put on by the victim;

calculating a deployment timing of the parachute according to the calculated parachute control information; and controlling an operation of the parachute according to the calculated deployment timing of the parachute so that the victim is safely landed by the parachute.

9. The method of claim 8, wherein the controlling of the parachute further includes: operating an airbag included in the parachute at the estimated landing time of the parachute.

* * * * *